United States Patent
Deguchi et al.

(10) Patent No.: US 8,127,102 B2
(45) Date of Patent: Feb. 28, 2012

(54) STORAGE SYSTEM, COPY METHOD, AND PRIMARY STORAGE APPARATUS

(75) Inventors: Makoto Deguchi, Odawara (JP); Hidenori Suzuki, Atami (JP)

(73) Assignee: Hitachi, Ltd., Tokyo (JP)

( * ) Notice: Subject to any disclaimer, the term of this patent is extended or adjusted under 35 U.S.C. 154(b) by 842 days.

(21) Appl. No.: 12/112,478

(22) Filed: Apr. 30, 2008

(65) Prior Publication Data

US 2009/0216972 A1    Aug. 27, 2009

(30) Foreign Application Priority Data

Feb. 27, 2008   (JP) ................. 2008-046724

(51) Int. Cl.
*G06F 12/00* (2006.01)

(52) U.S. Cl. ............... 711/173; 711/112; 711/E12.005
(58) Field of Classification Search ............. 711/173
See application file for complete search history.

(56) References Cited

U.S. PATENT DOCUMENTS 6,408,370 B2 *  6/2002  Yamamoto et al. ........... 711/167
(Continued)

FOREIGN PATENT DOCUMENTS

EP    1837767    9/2007
(Continued)

*Primary Examiner* — Reginald Bragdon
*Assistant Examiner* — Hamdy S Ahmed
(74) *Attorney, Agent, or Firm* — Brundidge & Stanger, P.C.

(57) ABSTRACT

A storage system having a primary storage apparatus for storing data from a host computer in a primary logical volume, and a secondary storage apparatus connected to the primary storage apparatus, for providing a secondary logical volume for storing a copy of the data, the storage system comprising: a search unit for checking whether or not data exists in each primary slot area formed by partitioning a storage area in the primary logical volume into predetermined storage areas; a transmission unit for sending, if no data is held in the primary slot area, a notice indicating no data stored to the secondary storage apparatus; and a data write unit for writing, when the notice is received from the primary storage apparatus, zero data in the secondary slot area.

16 Claims, 12 Drawing Sheets

U.S. PATENT DOCUMENTS

| | | |
|---|---|---|
| 2001/0029570 A1 | 10/2001 | Yamamoto et al. |
| 2005/0091455 A1 | 4/2005 | Kano et al. |
| 2007/0038833 A1 | 2/2007 | Yamamoto et al. |
| 2007/0226446 A1 | 9/2007 | Horiuchi et al. |
| 2007/0255914 A1 | 11/2007 | Maki et al. |
| 2008/0016303 A1 | 1/2008 | Okumoto et al. |
| 2009/0083502 A1 | 3/2009 | Horiuchi et al. |

FOREIGN PATENT DOCUMENTS

| | | |
|---|---|---|
| EP | 0902370 | 12/2007 |
| JP | 11-085408 | 3/1999 |
| JP | 2003-015915 | 1/2003 |

* cited by examiner

FIG4

| VIRTUAL VOLUME ADDRESS | SLOT NUMBER |
| --- | --- |
| 0000 | 0 |
| 0001 | |
| 0010 | |
| ⋮ | ⋮ |
| 0x10 | 3-10 |

7200    7201

VIRTUAL VOLUME MANAGEMENT TABLE 720

| SLOT NUMBER GROUP |
| --- |
| 1-50 |
| 51-100 |
| 101-150 |
| ⋮ |

SLOT GROUP MANAGEMENT TABLE

FIG.6

SLOT1, SLOT2, SLOT3, · · · · · SLOT10

| 0 | 0 | 1 | 1 | 1 | 1 | 1 | 1 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 1 | 1 | 0 | 0 | 1 | 1 | 1 | 1 | 1 |
| 0 | 0 | 0 | 0 | 0 | 0 | 0 | 0 | 0 | 0 |

SLOT50

SLOT GRID TABLE 722

FIG.7

| SLOT NUMBER 7230 | REAL VOLUME ADDRESS 7231 |
|---|---|
| 3 | 0000 |

SLOT TABLE 723

| SLOT NUMBER 7240 | COPY SOURCE ADDRESS 7241 | COPY DESTINATION ADDRESS 7242 |
|---|---|---|
| 3 | 0x10 | 0x10 |
| 4 | 0100 | 0100 |
| 5 | 1010 | 1010 |
| ⋮ | ⋮ | ⋮ |

PAIR SETTING TABLE 724

BITMAP TABLE M

FIG.11

| | | |
|---|---|---|
| SI10 | OPERATION CODE | INITIAL COPY |
| SI11 | SUB-INFORMATION | COPY DATA EXISTS |
| SI12 | ADDRESS INFORMATION | HEAD SLOT NUMBER IN REAL VOLUME |
| SI13 | USER DATA | USER DATA FOR ONE SLOT |

TRANSMISSION INFORMATION SI1

FIG.12

| | | |
|---|---|---|
| SI20 | OPERATION CODE | INITIAL COPY |
| SI21 | SUB-INFORMATION | NO COPY DATA |
| SI22 | ADDRESS INFORMATION | HEAD SLOT NUMBER IN REAL VOLUME |

TRANSMISSION INFORMATION SI2

STORAGE SYSTEM, COPY METHOD, AND PRIMARY STORAGE APPARATUS

CROSS-REFERENCE TO RELATED APPLICATIONS

This application relates to and claims priority from Japanese Patent Application No. 2008-046724 filed on Feb. 27, 2008, the entire disclosure of which is incorporated herein by reference.

BACKGROUND

1. Field of the Invention

The invention relates to a storage system, a copy method, and a primary storage apparatus. The invention is particularly suitable for use in a storage system including a storage apparatus where plural virtual volumes are paired.

2. Description of Related Art

A storage apparatus includes a controller for controlling data I/O to/from the storage apparatus and a disk device having plural hard disk drives for storing the data. A storage apparatus is an apparatus in which plural hard disks are managed in a RAID (Redundant Array of Independent/inexpensive Disks) format. At least one logical volume is formed in a physical storage area provided by a number of hard disks.

There is technology called remote copy, which is designed to avoid, by duplicating data in another storage apparatus located in a distant place, disaster-related loss of data, or similar, in such a storage apparatus.

Remote copy is technology for transferring data in a copy source storage apparatus (hereinafter referred to as a "primary storage apparatus") to a copy destination storage apparatus (hereinafter referred to as a "secondary storage apparatus") located in a distant place, and storing the data in a disk device in the secondary storage apparatus. A technique relating to remote copy is disclosed in Japanese Patent Laid-open Publication No. 11-85408, with which data is copied between different storage apparatuses not via a host computer. With the remote copy technology, data can be duplicated to avoid loss of data.

In recent years, Japanese Patent Laid-open Publication No. 2003-015915 has disclosed a technique in which no logical volume with a fixed capacity is created from a storage area in hard disks, but a virtual volume is provided using plural logical volumes. Storage areas in logical volumes are dynamically allocated to that virtual volume. With this configuration, storage areas that are in actuality dispersed over plural storage apparatuses can be provided as a single volume to a host computer.

Pairs of those virtual volumes are set and data is copied from a primary virtual volume to a secondary virtual volume, thereby maintaining data reliability.

If remote copy is executed utilizing the above described virtual volume technique on a storage system including primary and secondary storage apparatuses, all data (including zero data) in a primary virtual volume is copied to a secondary virtual volume when setting a pair so that the content of those virtual volumes are consistent.

However, in this method the amount of traffic is large, so data transfer takes a long time. Therefore, the load on the storage system accompanying data transfer is a problem.

SUMMARY

An object of the invention is to provide a storage system, a copy method, and a primary storage apparatus capable of reducing the load accompanying data transfer even in the case where remote copy is conducted when setting a virtual volume pair using the virtual volume technique in the storage system.

To achieve the above object, the invention provides a storage system for providing a primary logical volume formed with a storage area in plural hard disks, that includes a primary storage apparatus for storing data from a host computer in the primary logical volume, and a secondary storage apparatus connected to the primary storage apparatus, for providing a secondary logical volume for storing a copy of the data, the storage system comprising: a search unit for checking whether or not data exists in each primary slot area formed by partitioning a storage area in the primary logical volume into predetermined storage areas; a transmission unit for sending, if no data is held in the primary slot area, a notice indicating no data stored to the secondary storage apparatus; and a data write unit for writing, when the notice is received from the primary storage apparatus, zero data in the secondary slot area.

With that configuration, if data is not held in the primary logical volume when setting a pair, the primary storage apparatus only has to notify the secondary storage apparatus of no data being held, and the secondary storage apparatus writes zero data only. Accordingly, data transfer time and the load on the storage system accompanying data transfer is reduced.

The invention also provides a copy method for a storage system for providing a primary logical volume formed with a storage area in plural hard disks, that includes a primary storage apparatus for storing data from a host computer in the primary logical volume, and a secondary storage apparatus connected to the primary storage apparatus, for providing a secondary logical volume for storing a copy of the data, the method comprising: a search step for checking whether or not data exists in each primary slot area formed by partitioning a storage area in the primary logical volume into predetermined storage areas; a transmission step for sending, if no data is held in the primary slot area, a notice indicating no data stored to the secondary storage apparatus; and a data write step for writing, when the notice is received from the primary storage apparatus, zero data in the secondary slot area.

With that configuration, if data is not held in the primary logical volume when setting a pair, the primary storage apparatus only has to notify the secondary storage apparatus of no data being held, and the secondary storage apparatus writes zero data only. Accordingly, data transfer time and the load on the storage system accompanying data transfer is reduced.

The invention also provides a primary storage apparatus for providing a primary logical volume formed with a storage area in plural hard disks and storing data from a host computer in the primary logical volume, the primary storage apparatus comprising: a search unit for checking whether or not data exists in each primary slot area formed by partitioning the storage area in the primary logical volume into predetermined storage areas; and a transmission unit for sending, if no data is held in the primary slot area, a notice indicating no data held to a paired secondary storage apparatus.

With that configuration, if data is not held in the primary logical volume when setting a pair, the primary storage apparatus only has to notify the secondary storage apparatus of no data being held, and the secondary storage apparatus writes zero data only. Accordingly, data transfer time and the load on the storage system accompanying data transfer is reduced.

With the invention, only the data stored in the primary storage apparatus is transferred to the secondary storage apparatus when setting a pair, so the load on a storage system accompanying data transfer is reduced.

BRIEF DESCRIPTION OF THE DRAWINGS

FIG. 4 is a diagram showing a virtual volume management table in the embodiment.

FIG. 5 is a diagram showing a slot group management table in the embodiment.

FIG. 6 is a diagram showing a slot grid table in embodiment.

FIG. 7 is a diagram showing a slot table in the embodiment.

FIG. 11 is a diagram showing transmission information in the case where copy data is sent in the embodiment.

FIG. 12 is a diagram showing transmission information used when a "data unallocated" message in the embodiment is sent.

DETAILED DESCRIPTION OF PREFERRED EMBODIMENTS

An embodiment of the invention will be described below with reference to the drawings.

1. Storage System Configuration

Figure 1:
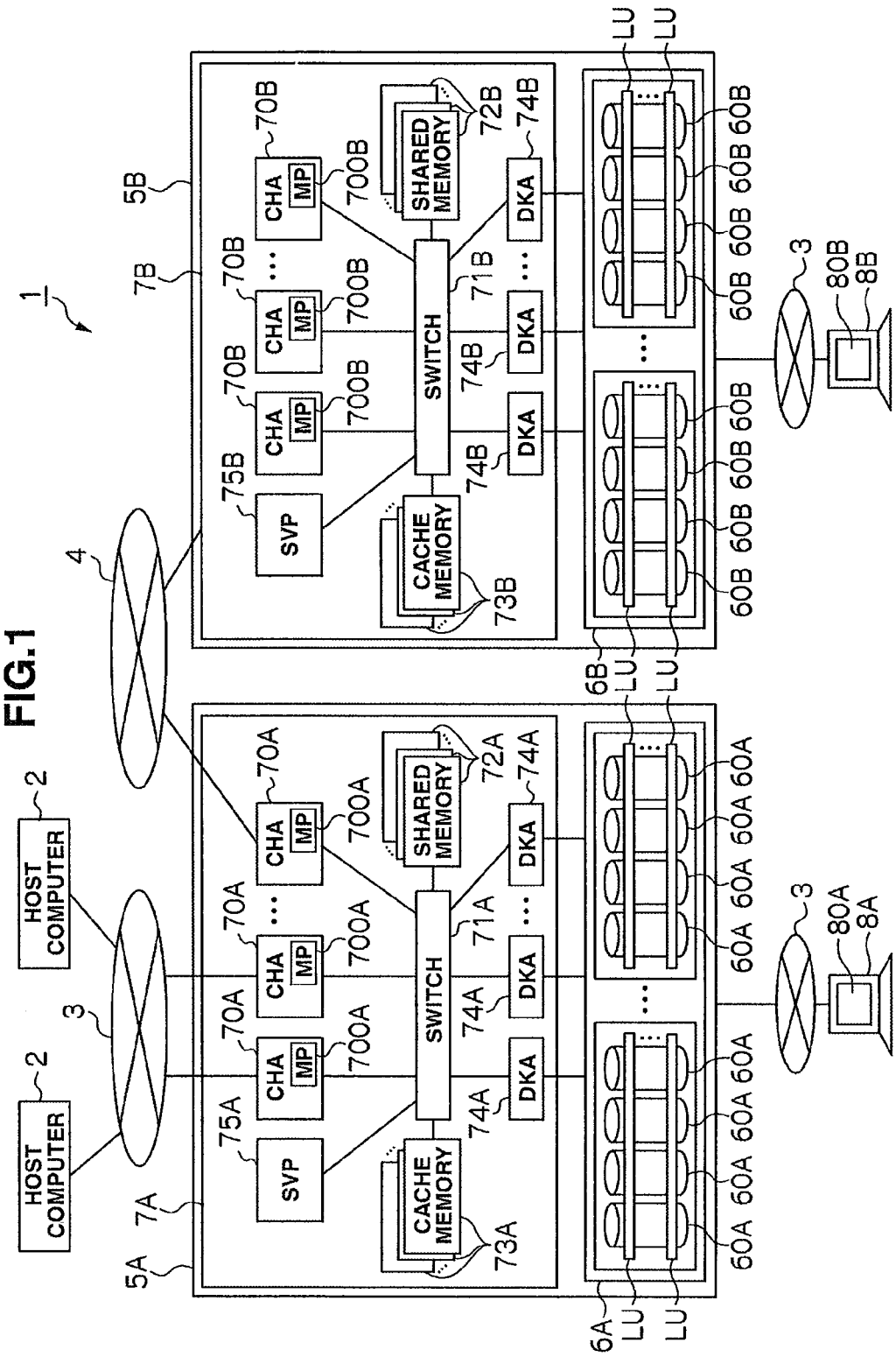
FIG. 1 is a block diagram showing a hardware configuration for a storage system in an embodiment.

Referring to FIG. 1, numerical reference 1 represents the overall storage system in this embodiment. In the storage system 1, a host computer 2 is connected to a primary storage apparatus 5A via a network 3, and the primary storage apparatus 5A is connected to a secondary storage apparatus 5B via a data copy network 4.

In this embodiment, a storage apparatus that directly inputs/outputs data sent to/from the host computer 2 is referred to as a primary storage apparatus 5A.

The host computer 2 is a computer device equipped with information processing resources such as a CPU and memory, and examples of the host computer 2 include a personal computer, a workstation, and a mainframe. The host computer 2 has information input devices such as a keyboard and a switch (not shown), and information output devices such as a monitor display and a speaker (not shown).

Examples of the network 3 and the data copy network 4 include a SAN (Storage Area Network), a LAN (Local Area Network), the Internet, a public line, or a dedicated line. If the network 3 is a SAN, data is communicated according to Fibre Channel protocol. If the network 3 is a LAN, data is communicated according to TCP/IP protocol. In this embodiment, the network 3 for connecting the host computer 2 with the primary storage apparatus 5A is a SAN, and the other networks 3 and the copy network 4 are LANS.

The storage apparatus 5 has a disk unit 6 including plural hard disks 60 (HDD) and a controller unit 7 for managing the hard disks 60 in a RAID format. The suffixes "A" and "B" are omitted, except where the storage apparatuses have to be distinguished between.

The hard disks 60 are expensive, high-access performance disks such as SCSI disks, or inexpensive, low-access performance disks such as SATA disks or optical disks.

The controller unit 7 includes plural channel adapters 70 (referred to as "CHA" in the drawings), a switch 71, shared memory 72, cache memory 73, plural disk adapters 74 (referred to as "DKA" in the drawings), and a service processor 75 (referred to as "SVP" in the drawings).

Each channel adapter 70 is a microcomputer system including a microprocessor 700, memory (not shown), and a communication interface, and the like, and is provided with a port P for connection to a network. Each channel adapter 70 interprets various commands sent from the host computer 2 and executes the required processing. A network address (such as an IP address or WWN) for identifying each channel adapter 70 is allocated to the port P in the channel adapters 70. With this configuration, each channel adapter 70 can individually serve as a NAS (Network Attached Storage).

The switch 71 is connected to the channel adapters 70, the shared memory 72, the cache memory 73, and the disk adapters 74. Data and commands are exchanged, via the switch 71, between the channel adapters 70, the shared memory 72, the cache memory 73, and the disk adapters 74.

The shared memory 72 is memory shared by the channel adapters 70 and the disk adapters 74. The shared memory 72 is used mainly for storing system configuration information, various control programs, and commands or similar sent from the host computer 2. The tables and program stored in the shared memory 72 will be described later.

The cache memory 73 is also memory shared by the channel adapters 70 and the disk adapters 74. The cache memory 73 is used mainly for temporarily storing data input to/output from the storage apparatuses.

The disk adapter 74 is a microcomputer system including a microprocessor 700 (not shown) and memory (not shown), and the like, and functions as an interface for controlling protocols used during communication with the disk unit 6. Each disk adapter 74 is connected to a relevant disk unit 6 via, for example, a Fibre Channel cable, and exchanges data with that disk unit 6 in accordance with Fibre Channel protocol.

The service processor 75 is a computer device for maintaining the storage apparatuses 5, and examples of the service processor 75 include a personal notebook computer. The service processor 75 is connected to the host computer 2 via the network 3, and is able to receive data or commands from the host computer 2.

The storage navigator 8 is a computer device operated for managing the storage apparatuses 4, and examples of the storage navigator 8 include a personal computer. The storage navigator 8 sets storage apparatuses to be paired from among the plural storage apparatuses, sets a pair of virtual volumes V described later, and manages the association between a virtual volume V and a logical volume, which will also be described later. The storage navigator 8 may display the setting and management on a management screen 80.

2. Logical Configuration for Hard Disks

In the storage system 1 in this embodiment, four disks in the hard disks 60 form a single RAID group. One or more logical volume(s) LU are defined in a storage area provided by the single RAID group.

A specific identifier LUN (Logical Block Number) is allocated to each logical volume LU. Data is input or output by specifying an address, which is a combination of the identifier and a specific number LBA (Logical Block Address) assigned to each block, which is a logical division of a logical volume.

Figure 2:
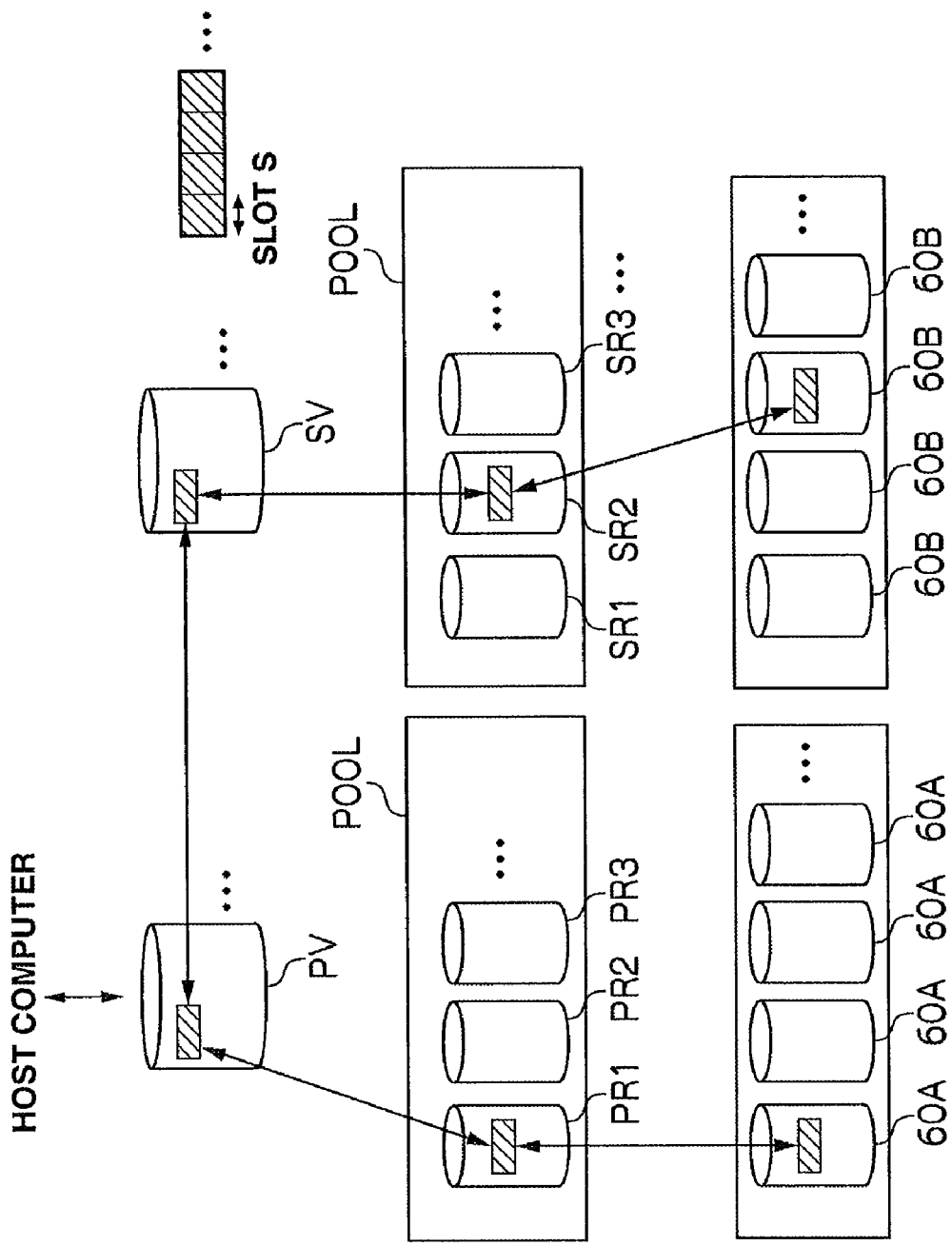
FIG. 2 is a conceptual diagram illustrating logical volumes in the embodiment.

FIG. 2 is a conceptual diagram showing a logical configuration for the hard disks 60 in the storage system 1.

The logical volumes LU include virtual volumes V, which are logical volumes accessed by the host computer 2, and real volumes R, which are associated with those virtual volumes V. Each storage area in the real volumes R is associated with a real storage area in the hard disks 60. A pool area POOL is formed with plural real volumes R.

Storage areas are provided to the virtual volumes V by dynamically allocating, to the virtual volumes V, storage areas in the real volumes R in the pool area POOL. Since the virtual volumes V do not have physical presence of volumes, when data is stored in response to a write request or similar from a host computer 2, a storage area in a real volume R included in a pool area POOL is reserved to store the data. If a read request from the host computer 2 is issued to an area that has reserved no storage area in a real volume R in the pool area POOL, the virtual volume V reads zero data from the pool area POOL to respond to the host computer 2. Thus a volume having an arbitrary capacity that does not depend on the physical capacity can be provided to the host computer 2 by virtually creating a volume capacity of the virtual volume V.

Each storage area in the virtual volumes V and real volumes R is partitioned by a storage area referred to as a "slot S." The virtual volumes V and the real volumes R are associated with each other in units of slots S. A slot S is a minimum storage area where the above described data is stored, and corresponds to the above mentioned block.

This embodiment aims at not only setting a pair of two virtual volumes V, but also setting a pair of a virtual volume V and a real volume R. A virtual volume V directly accessed by the host computer 2 is referred to as a "primary virtual volume V," and a copy destination virtual volume V where data stored in the primary virtual volume PV (in actuality, data in a storage area in the hard disks 60 allocated to the primary volume PV) is copied is referred to as a "secondary virtual volume SV."

A real volume associated with a primary virtual volume PV is referred to as a primary real volume PR, and a real volume associated with a secondary virtual volume SV is referred to as a secondary real volume SR.

Both the primary and secondary virtual/real volumes are described as virtual volumes V/real volumes R except where primary or secondary are specified.

3. Table Configuration

Various tables held in the storage system 1 will be described. The primary and secondary storage apparatuses 5A and 5B respectively hold each of the below tables. The suffixes A and B are not used except where the tables are specified.

Figure 3:
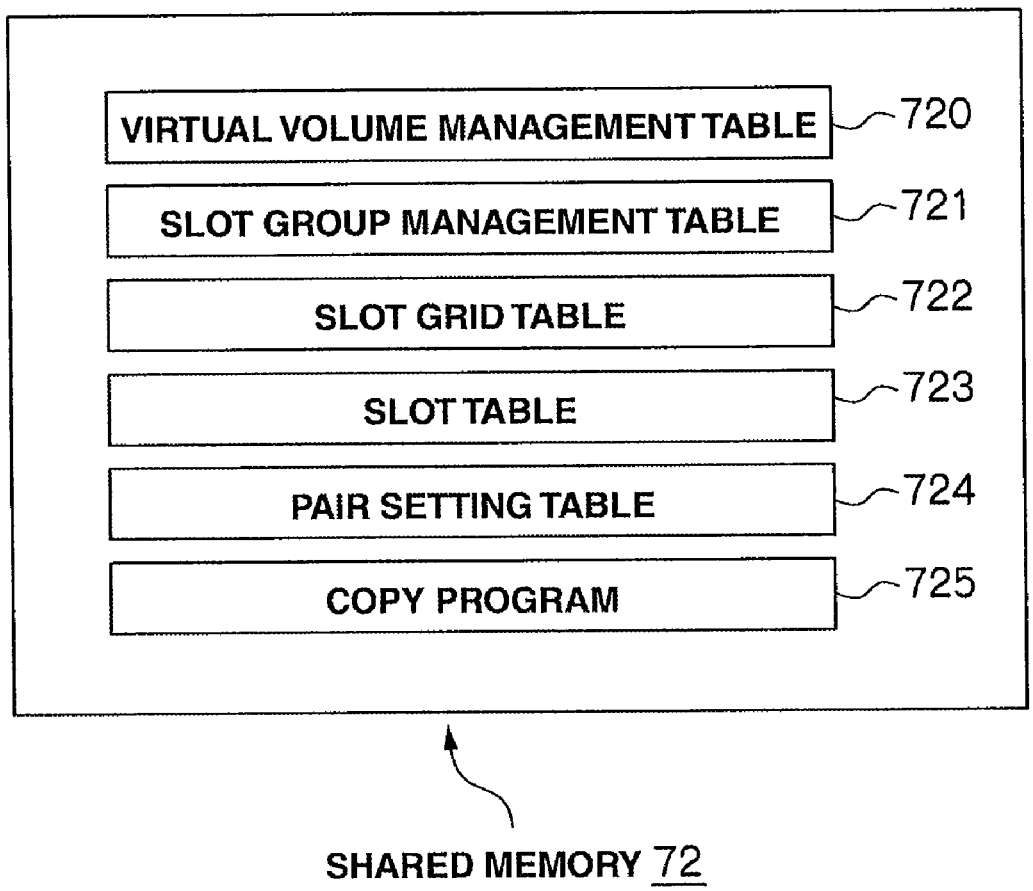
FIG. 3 is a block diagram showing the content of shared memory in the embodiment.

First, FIG. 3 shows an example of various tables and a program stored in the shared memory 72.

The shared memory 72 stores a virtual volume management table 720, a slot group management table 721, a slot grid table 722, a slot table 723, a pair setting table 724, and a copy program 725. In particular, the virtual volume management table 720, the slot group management table 721, the slot grid table 722, and the slot table 723 are association information used to associate, aside from the pair setting, storage areas of a virtual volume V and a real volume R in a storage apparatus 5. The copy program 725 is a program for having the storage apparatus 5 form a copy pair and execute copying.

3-1. Virtual Volume Management Table

The virtual volume management table 720 is a table where storage areas of virtual volumes and associated slot numbers are stored. The virtual volume management table 720 includes "virtual volume address" entries 7200 and "slot number" entries 7201.

For example, as shown in FIG. 4, the virtual volume management table 720 holds slot numbers "3-10," which are associated with a virtual volume address "0x10."

3-2. Slot Group Management Table

The slot group management table 721 is a table for managing plural slots by groups, and includes "slot number group" entries 7210.

For example, the slot group management table 721 in FIG. 5 indicates that plural slots are managed in groups of fifty. Accordingly, the slot numbers "3-10" are managed in the first line of the slot group management table 721.

3-3. Slot Grid Table

The slot grid table 722 is a table showing, in a grid, plural slot numbers respectively managed in each line in the slot group management table 721.

For example, if slots are managed in groups of fifty in the slot group management table 721, slots #1 to #50 are managed in one slot grid table 722, and the subsequent slots #51-#100 are managed in another slot grid table 722. In the slot grid table 722, a slot is associated with a virtual volume, "1," which means "an allocated area," is held. Meanwhile, if a slot is not associated with a virtual volume, "0," which means "an unallocated area," is held.

For example, in the slot grid table 722 in FIG. 6, slot numbers "3-10" are unallocated areas ("1").

3-4. Slot Table

The slot table 723 is a table prepared for each slot number, and stores a real volume address allocated to an arbitrary slot number. The slot table 723 includes a "slot number" entry 7230 and a "real volume address" entry 7231.

For example, the slot table 723 in FIG. 7 holds real volume address "0000," which is allocated to slot number "3."

3-5. Pair Setting Table

The pair setting table 724 is a table for managing settings for pairs of copy source storage areas and copy destination storage areas. The pair setting table 724 includes "slot number" entries 7240, "copy source address" entries 7241, and "copy destination address" entries 7242.

Figures 8, 9:
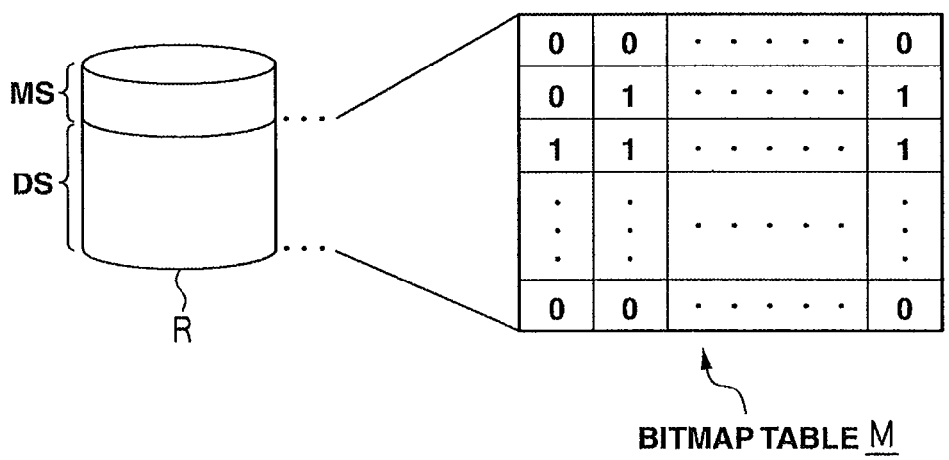
FIG. 8 is a diagram showing a pair setting table in the embodiment.
FIG. 9 is a diagram illustrating a bitmap table in the embodiment.

For example, the pair setting table 724 shown in FIG. 8 holds primary and secondary storage areas associated with slot number "3." Each of those primary and secondary storage areas is associated with address "0x10."

3-6. Bitmap Table

The bitmap table M is management information that reflects the status of storage areas DS (hereinafter referred to as data storage areas DS) where data in real volumes R is stored, and is partitioned like a grid for management. The bitmap table M is a table used for real volumes that are not associated with virtual volumes V. A slot number is allocated to each entry in the grid of the bitmap table M. The bitmap table M is stored in a management storage area MS for storing management information about real volumes R. The bitmap table has been explained as being managed in units of slots, but may also be managed in units other than slots, such as pages or blocks in the virtual volumes.

For example, as shown in FIG. 9, if data is stored in an arbitrary real volume R. "1" is stored in the slot number entries corresponding to the storage areas that store the data. If data is not stored, "0" is stored in the slot number entries corresponding to the storage areas that do not store data.

4. Processing for Data Transfer

Data transfer in this embodiment for pairs set between: a primary virtual volume PV and a secondary virtual volume SV (first pair setting), between a primary virtual volume PV a secondary real volume SR (second pair setting), and between a primary real volume PR and a secondary virtual volume SR (third pair setting) will be described below.

4-1. First Pair Setting

First, processing for data transfer in the case where a primary virtual volume PV and a secondary virtual volume SV are paired in the storage system 1 will be described. In this case, in the pair setting table 724 an address in the primary virtual volume PV is set as the copy source address, and an address in the secondary virtual volume SV is set as the copy destination address.

4-1-1. Processing for Data Transfer in Primary Storage Apparatus

Figure 10:
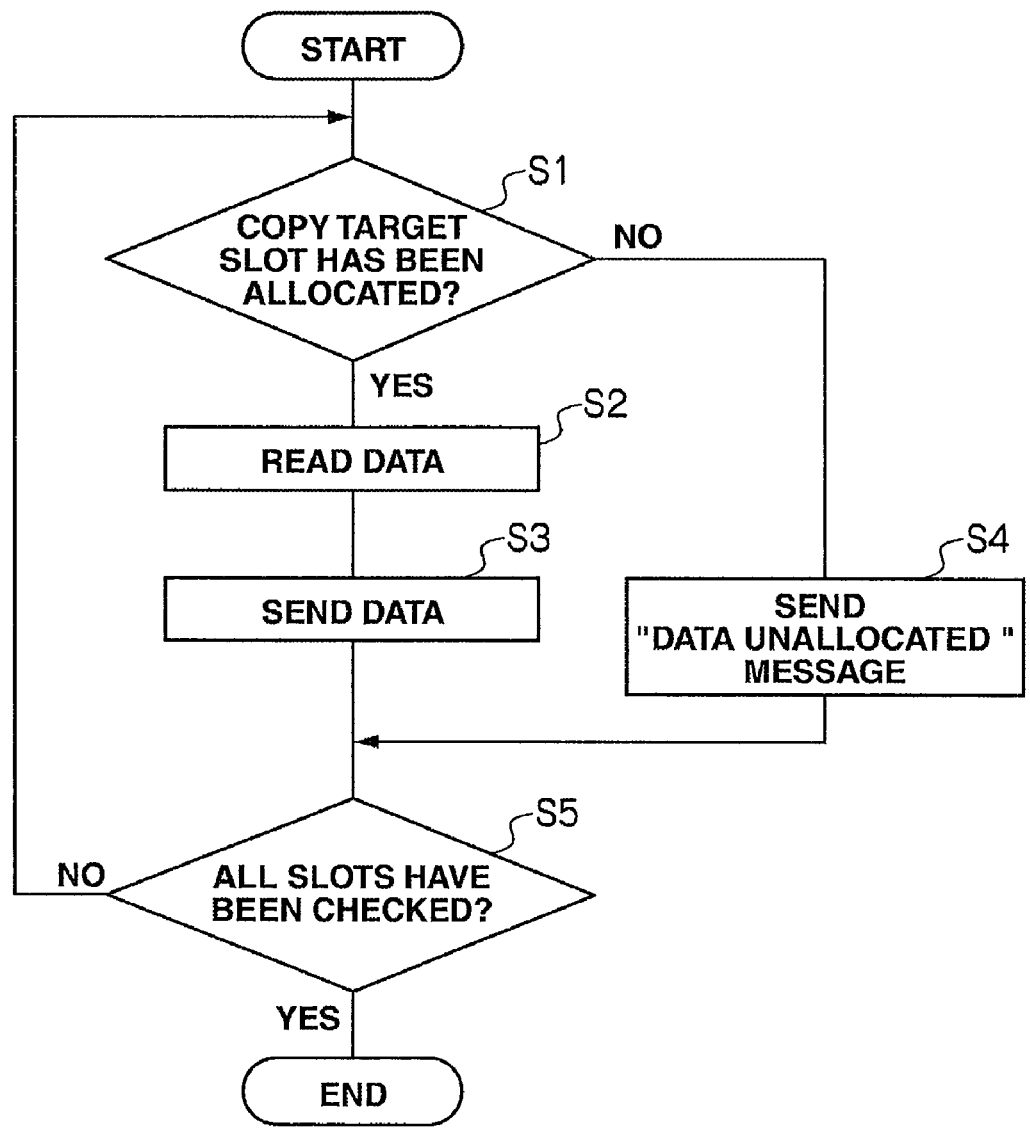
FIG. 10 is a flowchart showing processing for data transfer executed by a primary storage apparatus in a first pair setting in the embodiment.

Processing for data transfer in a primary storage apparatus shown in FIG. 10 is described. The data transfer in the primary storage apparatus 5A is executed by a microprocessor 700A in each channel adapter 70A based on the copy program 725.

After receiving a remote copy order from the host computer 2 or the storage navigator 8A, the microprocessor 700A refers to the bitmap table M and checks whether or not the first slot S in the primary virtual volume PV has already been allocated (S1). In other words, the microprocessor 700A checks whether or not data is stored in the primary real volume associated with the primary virtual volume PV. When doing so, the microprocessor 700A checks whether or not the above described virtual volume management table 720A, slot group management table 721A, slot grid table 722A, and slot table 723A have been allocated to a copy target slot S.

If the microprocessor 700A judges the copy target slot S as having already been allocated (S1: Yes), the data is stored in the primary real volume PR, so the microprocessor 700A reads data from the address in the primary real volume PR associated with the primary virtual volume PV (S2). The address in the associated primary real volume PR is searched for in the above described slot table 723.

The microprocessor 700A refers to the pair setting table 724 and sends the above read data to the pair target secondary virtual volume SV (S3).

Information used when sending data to the pair target secondary virtual volume SV is shown in FIG. 11. The transmission information SI1 contains "operation code" SI10 for notifying the secondary storage apparatus 5B of an initial copy, "sub-information" SI11 for notification of whether or not copy data exists, "address information" SI12 about a copy source address, and "user data" SI13.

Since in step S3 copy data is sent, "copy data exists" is registered as the "sub-information" SI11. In the "address information" SI12, the head slot number in the primary real volume PV, which is the position to start the copy, is held. "Data for 1 slot S" is registered as "user data" SI13.

Meanwhile, if the microprocessor 700A judges the copy target slot S as being unallocated (S1: NO), data is not stored in the primary real volume PR, so the microprocessor 700A sends, to the secondary storage apparatus 5B, a "data unallocated" message, which indicates no data stored in the storage area (slot S) in the copy target primary virtual volume PV (S4).

Information used when sending the "data unallocated" message to the pair target secondary virtual volume SV is shown in FIG. 12. The transmission information SI2, which is the notification message for "unallocated data," contains "operation code" SI20, "sub-information" SI21, and "address information" SI22, which is information on a copy source address.

In step S4, copy data is not sent; only a message is sent, so "no copy data" is held as the "sub-information" SI21. The head slot number in the primary real volume PV for which whether or not data is stored has been checked is held as the "address information" SI22.

Thus the microprocessor 700A checks whether or not all slots S have been allocated (S5). If not all slots S have been checked (S5: NO), the processing in steps S1 to S4 is repeated for the subsequent check target slots S.

After the allocation of all slots S has been checked (S5: Yes), the microprocessor 700A terminates the processing for data transfer in the primary storage apparatus 5A.

4-1-2. Processing for Data Transfer in Secondary Storage Apparatus

Figure 13:
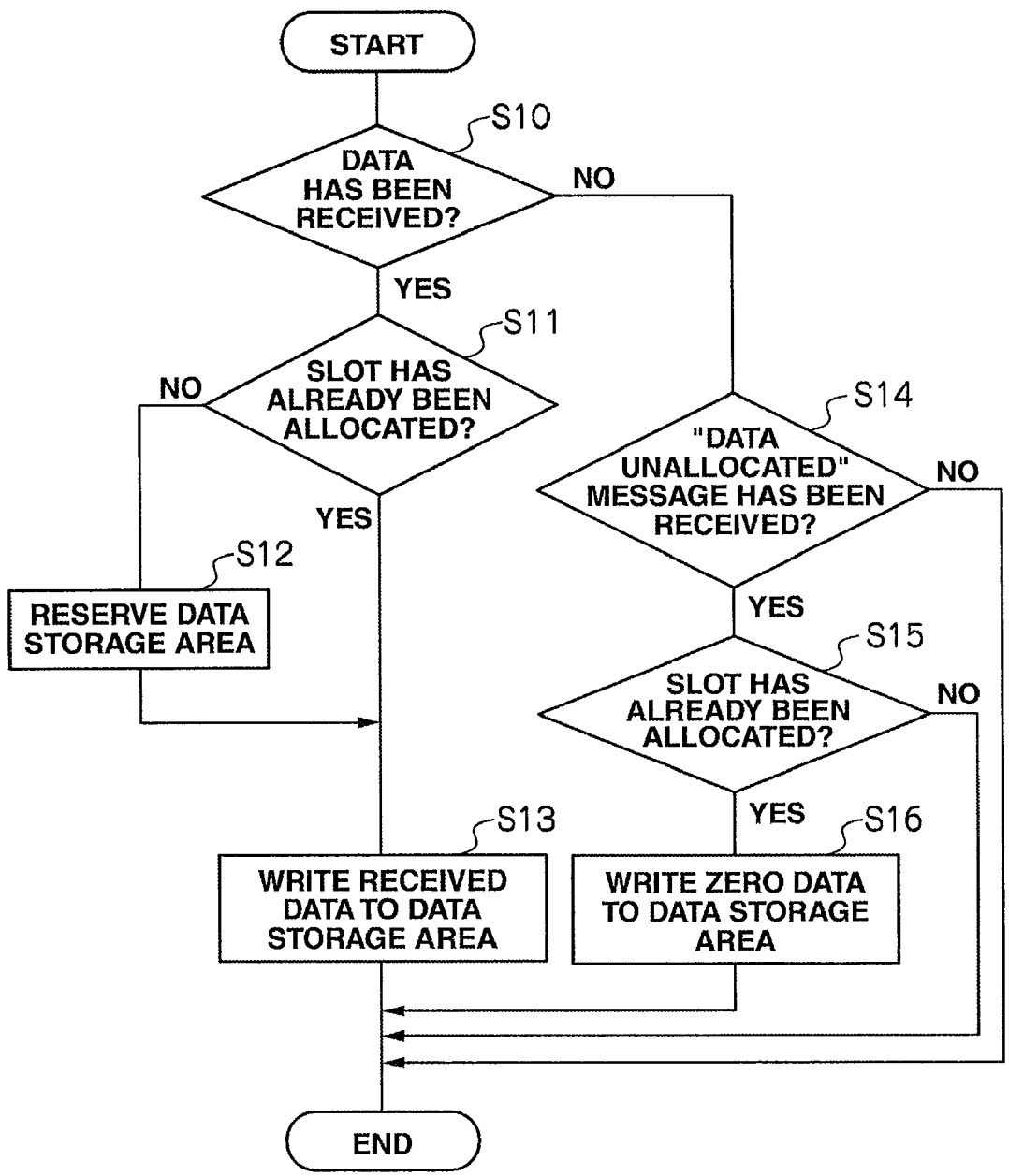
FIG. 13 is a flowchart showing processing for data transfer executed by a secondary storage apparatus in a first pair setting in the embodiment.

Next, processing for data transfer in the secondary storage apparatus 5B shown in FIG. 13 will be described. The data transfer in the secondary storage apparatus 5B is executed by a microprocessor 700B in each channel adapter 70B based on the copy program 725.

First, if the microprocessor 700B judges the data as having been received from the primary storage apparatus 5A (S10: Yes), the microprocessor 700B refers to the pair setting table 724 and searches for the copy target secondary virtual volume SV. After that, the microprocessor 700B refers to the bitmap table M and checks whether or not each slot S in the above searched secondary virtual volume SV has already been allocated to a secondary real volume SR (S11). In this step, the microprocessor 700B checks whether or not the above described virtual volume management table 720B, slot group management table 721B, slot grid table 722B, and slot table 723B have been allocated to a copy target slot S.

If each slot S in the secondary virtual volume SV searched for by the microprocessor 700B has not been allocated to a secondary real volume SR (S11: NO), no data is stored in the secondary real volume SR, so a data storage area DS is reserved in the secondary real volume SR (S12). In this step, the microprocessor 700B sets, in the virtual volume management table 720B, the slot group management table 721B, the slot grid table 722B, and the slot table 723B, the relationship between the above reserved storage area in the secondary real volume SR and the secondary virtual volume SV.

After that, the microprocessor 700B writes the received data to the reserved data storage area DS in the secondary real volume SR (S13), and terminates the processing for data transfer.

Meanwhile, if each slot S in the secondary virtual volume SV searched for by the microprocessor 700B have already been allocated (S11: Yes), the microprocessor 700B writes the received data to the data storage area DS in the associated secondary real volume SR (S13), and terminates the processing for data transfer.

In step S10, if the microprocessor 700B has not received data from the primary storage apparatus 5A (S10: NO) but received a "data unallocated" message (S14: Yes), the microprocessor 700B refers to the pair setting table 724 and searches for the copy target secondary virtual volume SV. After that, the microprocessor 700B refers to the virtual volume management table 720B, the slot group management table 721B, the slot grid table 722B, and the slot table 723B, and checks whether or not each slot S in the above searched secondary virtual volume SV has already been allocated to a secondary real volume SR (S15).

If each slots S in the secondary virtual volume SV searched for by the microprocessor 700B has already been allocated (S15: Yes), the microprocessor 700B writes zero data to the data storage area DS in the associated real volume SR (S16) and terminates the processing for data transfer.

As described above, by setting primary and secondary virtual volumes V to be paired, the storage system 1 can create a virtual volume V having a capacity larger than the capacity of each real volume R. Accordingly, a large-capacity virtual volume V can be prepared in advance in consideration of the volume capacity that will increase in the future.

For an unallocated area in a primary virtual volume PV, the primary storage apparatus 5A only has to transfer a "data unallocated" message to the secondary storage apparatus 5B, so processing relating to data transfer for that allocated area in the secondary storage apparatus 5B is unnecessary. Accordingly, as a whole, transfer time and processing time in the secondary storage apparatus 5B is greatly reduced.

4-2. Setting of Second Pair

Next, processing for data transfer executed in the case where a primary virtual volume PV and a secondary real volume SR are paired in the storage system 1 will be described. In this case, in the pair setting table 724, an address in the primary virtual volume PV is set as a copy source address, and an address in the secondary real volume SR is set as a copy destination address.

4-2-1. Processing for Data Transfer in Primary Storage Apparatus

As the processing for data transfer in the primary storage apparatus is the same as the processing in the above described steps S1-S5, an explanation has been omitted.

4-2-2. Processing for Data Transfer in Secondary Storage Apparatus

Figure 14:
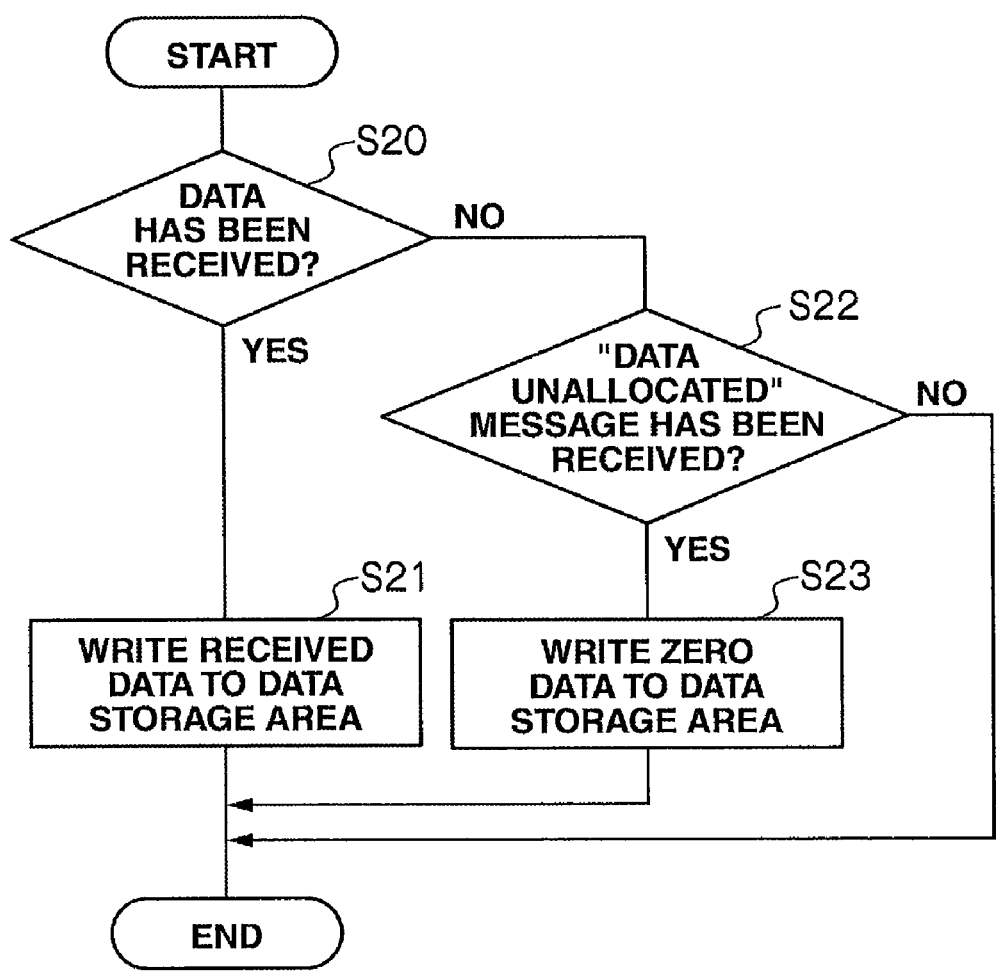
FIG. 14 is a flowchart showing processing for data transfer executed by a secondary storage apparatus in a second pair setting in the embodiment.

Next, processing for data transfer in the secondary storage apparatus 5B shown in FIG. 14 will be described. The data transfer method in the secondary storage apparatus 5B is executed by a microprocessor 700B in each channel adapter 70B based on the copy program 725B.

First, if the microprocessor 700B checks, from the transmission information SI1 given from the primary storage apparatus 5A, that data has been received (S20: Yes), the microprocessor 700B refers to the pair setting table 724B and searches for a copy target secondary real volume SR.

After that, the microprocessor 700B writes the received data to the data storage area DS indicated by an address in the above searched secondary real volume SR (S21), and terminates the processing for data transfer.

In step S20, if the microprocessor 700B checks, from the transmission information SI2 given from the primary storage apparatus 5A, that data has not been received (S20: NO) but a "data unallocated" message has been received (S22: Yes), the microprocessor 700B writes zero data to the data storage area DS indicated by an address in the above searched secondary real volume SR (S23) and terminates the processing for data transfer.

Figure 15:
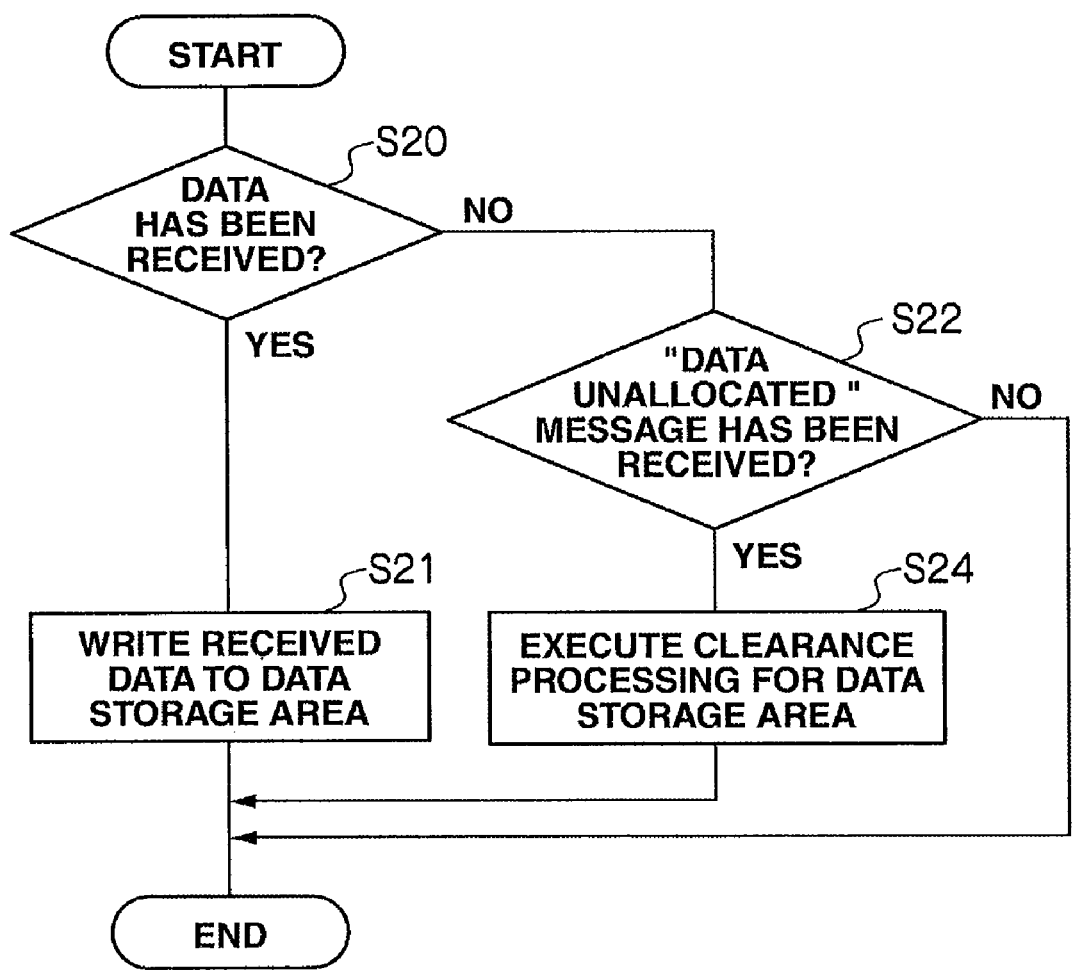
FIG. 15 is a flowchart showing processing for quick format executed by a secondary storage apparatus in a second pair setting in the embodiment.
Figure 16:
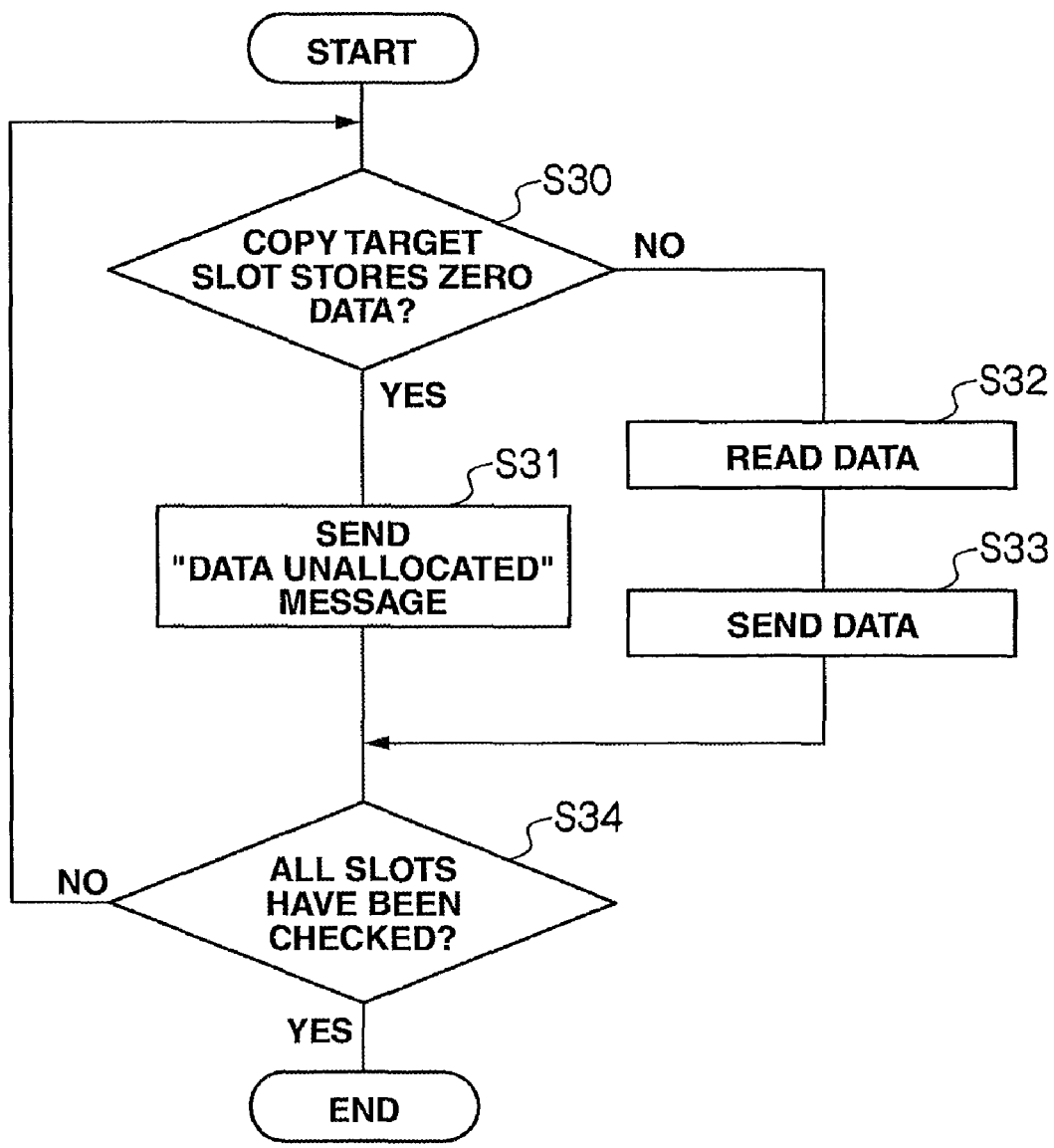
FIG. 16 is a flowchart showing processing for data transfer executed by a primary storage apparatus in a third pair setting.

As shown in FIG. 15, the secondary storage apparatus 5B may execute "quick format" processing. The "quick format" processing is processing for erasing data in a data storage area DS in the secondary real volume SR.

More specifically, in step S20, if the microprocessor 700B checks, from the transmission information SI2 given from the primary storage apparatus 5A, that data has not been received (S20: NO) but a "data unallocated" message has been received (S22: Yes), the microprocessor 700B erases data stored in the data storage area in the secondary real volume SR (S24). When doing so, the microprocessor 700B sets the target slot S in the bitmap table M stored in the secondary real volume SR to "0."

After that, the microprocessor 700B terminates the processing for data transfer.

As described above, since a virtual volume V is set as a primary volume and a real volume R is set as a secondary volume to form a pair, the primary storage apparatus 5A only has to transfer, regarding an unallocated area in a primary virtual volume PV, a "data unallocated" message to a secondary storage apparatus 5B. In addition, the secondary storage apparatus 5B only has to write zero data to the data storage area DS in the above set pair, so processing relating to data transfer is unnecessary. Accordingly, as a whole, transfer time can be reduced.

4-3. Third Pair Setting

Next, processing for data transfer executed when in a primary real volume PR and a secondary virtual volume SV in the storage system 1 are paired will be described. In this case, in the pair setting table 724, an address in a primary real volume PR is set as a copy source address, and an address in a secondary virtual volume SV is set as a copy destination address.

4-3-1. Processing for Data Transfer in Primary Storage Apparatus

Processing for data transfer in a primary storage apparatus shown in FIG. 9 will be described. The data transfer in a primary storage apparatus 5A is executed by a microprocessor 700A in each channel adapter 70A based on the copy program 725.

The microprocessor 700A reads, after receiving a remote copy order from the host computer 2 or the storage navigator 8A, the bitmap table M from a management storage area MS in the primary real volume PR, and checks whether or not the first copy target slot S in the primary real volume PR is "0" (S30). More specifically, the microprocessor 700A checks whether or not data is stored in the data storage area DS at the position of the first slot S.

If the microprocessor 700A determines that the first copy target slot S is "0" (S30: Yes), the microprocessor 700A sends a "data unallocated" message as transmission information SI2 to the secondary storage apparatus 5B (S31).

Meanwhile, if the microprocessor 700A determines that data exists in the data storage area DS corresponding to the first copy target slot S (S30: NO), the microprocessor 700A reads data from that data storage area DS (S32) and sends the above read data as the transmission information SI1 to the secondary storage apparatus 5B (S33).

The microprocessor 700A checks, for all slots, whether or not each slot S has been allocated (S34). If not all slots S have been checked (S34: NO), processing in steps S30 to S33 is executed again on the subsequent check target slots S.

If the microprocessor 700A has checked the allocation status of all slots S (S34: NO), the microprocessor 700A terminates the processing for data transfer in the primary storage apparatus 5A.

4-3-2. Processing for Data Transfer in Secondary Storage Apparatus

Since the processing for data transfer in the secondary storage apparatus are the same as the processing in above described steps S20 to S24, an explanation has been omitted.

As described above, since a real volume R is set as a primary volume and a virtual volume R is set as a secondary volume to form a pair, the primary storage apparatus 5A searches for an area in the primary real volume PR where data is not stored, and the primary storage apparatus 5A only has to transfer, regarding the area where data is not stored, a "'data unallocated' message" to a secondary storage apparatus 5B. Since the secondary storage apparatus 5B only has to write zero data to a data storage area DS in paired volumes, processing for data transfer is unnecessary and transfer time is reduced.

5. Advantage of this Embodiment

As described above, in this embodiment, when setting a pair only the data stored in a primary storage apparatus is transferred to a secondary storage apparatus. Accordingly, the load on the storage system accompanying data transfer is reduced.

The invention can be widely used in storage systems having one or more storage apparatus(es), or other types of storage systems.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system comprising:
   a primary storage apparatus including plural hard disks for storing data sent from a host computer, forming at least one real volume with the plural hard disks and providing a primary virtual volume to which a storage area of a real volume of the at least one real volume is dynamically allocated in response to a write request from the host computer; and
   a secondary storage apparatus connected to the primary storage apparatus providing a secondary virtual volume for storing copy data sent from the primary virtual volume,
   wherein the primary storage apparatus checks whether or not the storage area is allocated to each primary slot area formed by partitioning a storage area in the primary virtual volume into predetermined storage areas when the primary virtual volume and the secondary virtual volume are paired,
   wherein if no storage area is allocated to the primary slot area, the primary storage apparatus sends a notice indicating no data is stored to the secondary storage apparatus,
   wherein when the notice is received from the primary storage apparatus, the secondary storage apparatus writes zero data in the secondary slot area, and
   wherein if the storage area of the real volume is not allocated to the primary slot area, the secondary storage apparatus writes no zero data to the secondary slot area related to the primary slot area included in the notice, and if the storage area of the real volume is allocated to the primary slot area, the secondary storage apparatus writes zero data in the secondary slot area related to the primary slot area included in the notice.

2. The storage system according to claim 1,
   wherein if data is held in the primary slot area, the primary storage apparatus sends the data to the secondary storage apparatus, and
   wherein if the secondary storage apparatus receives the data from the primary storage apparatus, the secondary storage apparatus writes the data to a secondary slot area formed by partitioning, into predetermined storage areas, a storage area in the primary virtual volume to be paired.

3. The storage system according to claim 1, wherein the primary virtual volume is a real volume for storing the data, or a virtual volume recognized by the host computer for dynamically providing a storage area in the real volume.

4. The storage system according to claim 3 further comprising:
   primary association information for associating, if the primary virtual volume is a primary virtual volume, a slot area in the primary virtual volume with a slot area in the primary real volume where the data is stored,
   wherein the primary storage apparatus checks whether or not data exists based on whether or not the primary association information exists.

5. The storage system according to claim 3 further comprising:
   management information for managing, if the primary virtual volume is a primary real volume, whether or not the data exists, in units of the slot areas in the primary real volume,
   wherein the primary storage apparatus checks whether or not data exists based on whether or not the management information exists.

6. The storage system according to claim 3 further comprising:
   secondary association information for associating, if the secondary virtual volume is a secondary virtual volume, a slot area in the secondary virtual volume with a slot area in the secondary real volume where the data is stored, and
   wherein the secondary storage apparatus reserves, if the secondary association information is not held, a storage area in the secondary real volume to store data sent from the primary storage apparatus.

7. A copy method for a storage system, the storage system comprising:
   a primary storage apparatus including plural hard disks for storing data sent from a host computer, forming at least one real volume with the plural hard disks and providing a primary virtual volume to which a storage area of the real volume is dynamically allocated in response to a write request from the host computer,
   a secondary storage apparatus connected to the primary storage apparatus providing a secondary virtual volume for storing copy data sent from the primary virtual volume,
   the method comprising:
   checking, by the primary storage apparatus, whether or not the storage area is allocated to each primary slot area formed by partitioning a storage area in the primary virtual volume into predetermined storage areas when the primary virtual volume and the secondary virtual volume are paired; and
   if no storage area is allocated to the primary slot area, sending, by the primary storage apparatus, a notice indicating no data is stored to the secondary storage apparatus;

when the notice is received from the primary storage apparatus, writing, by the secondary storage apparatus, zero data in the secondary slot area;

if the storage area of the real volume is not allocated to the primary slot area, writing, by the secondary storage apparatus, no zero data to the secondary slot area related to the primary slot area included in the notice; and if the storage area of the real volume is allocated to the primary slot area, writing, by the secondary storage apparatus, zero data in the secondary slot area related to the primary slot area included in the notice.

8. The copy method according to claim 7, further comprising:

if data is allocated to the primary slot area, sending the data to the secondary storage apparatus; and when the data is received from the primary storage apparatus, writing the data to a secondary slot area formed by partitioning, into predetermined storage areas, a storage area in the primary virtual volume to be paired.

9. The copy method according to claim 7, wherein the primary virtual volume is a real volume for storing the data or a virtual volume recognized by the host computer, for dynamically providing a storage area in the real volume.

10. The copy method according to claim 9, further comprising:

a primary association step for associating, if the primary virtual volume is a primary virtual volume, a slot area in the primary virtual volume with a slot area in the primary real volume where the data is stored, and managing information about that association as primary association information, wherein whether or not the storage area is allocated to each primary slot area data exists is checked based on whether or not the primary association information exists.

11. The copy method according to claim 9, further comprising:

a management step for managing, if the primary virtual volume is a primary real volume, as management information, whether or not the data exists, in units of the slot areas in the primary real volume, wherein whether or not the storage area is allocated to teach primary slot area is checked based on whether or not the management information exists.

12. The copy method according to claim 9, further comprising:

a secondary association step for associating, if the secondary virtual volume is a secondary virtual volume, as secondary association information, a slot area in the secondary virtual volume with a slot area in the secondary real volume where the data is stored, wherein in the data write step, if the secondary association information is not held, a storage area in the secondary real volume to store data sent from the primary storage apparatus is reserved.

13. A primary storage apparatus comprising:

plural hard disks for storing data sent from a host computer, forming at least one real volume with the plural hard disks and providing a primary virtual volume to which a storage area of a real volume of the at least one real volume is dynamically allocated in response to a write request from the host computer, wherein a secondary storage apparatus is connected to the primary storage apparatus providing a secondary virtual volume for storing copy data sent from the primary virtual volume;

a search unit for checking whether or not the storage area is allocated to each primary slot area formed by partitioning the storage area in the primary virtual volume into predetermined storage areas when the primary virtual volume and the secondary virtual volume are paired; and a transmission unit for sending, if no storage area is allocated to the primary slot area, a notice indicating no data is stored to the secondary storage apparatus.

14. The primary storage apparatus according to claim 13, wherein the primary virtual volume is a real volume for storing the data or a virtual volume recognized by the host computer for dynamically providing a storage area in the real volume.

15. The primary storage apparatus according to claim 14, further comprising primary association information for associating, if the primary virtual volume is a primary virtual volume, a slot area in the primary virtual volume with a slot area in the primary real volume, wherein the search unit checks whether or not data exists based on whether or not the primary association information exists.

16. The primary storage apparatus according to claim 14, further comprising:

management information for managing, if the primary virtual volume is a primary real volume, whether or not the data exists, in units of slot areas in the primary real volume, wherein the search unit checks whether or not data exists based on whether or not the management information exists.

\* \* \* \* \*